United States Patent
O'Donoghue

(10) Patent No.: US 8,166,529 B2
(45) Date of Patent: Apr. 24, 2012

(54) METHOD AND DEVICE FOR AUTHENTICATING A USER IN A VARIETY OF CONTEXTS

(75) Inventor: Niall O'Donoghue, Narva (FI)

(73) Assignee: Nokia Corporation, Espoo (FI)

( * ) Notice: Subject to any disclaimer, the term of this patent is extended or adjusted under 35 U.S.C. 154(b) by 840 days.

(21) Appl. No.: 10/608,235

(22) Filed: Jun. 27, 2003

(65) Prior Publication Data

US 2004/0064701 A1    Apr. 1, 2004

(30) Foreign Application Priority Data

Jun. 28, 2002 (FI) .................................... 20021284

(51) Int. Cl.
 *H04L 29/06* (2006.01)
(52) U.S. Cl. .......................................... 726/7; 713/175
(58) Field of Classification Search .................. 713/156, 713/173, 168, 172, 175; 726/4, 5, 9, 10, 726/19, 20; 705/66, 67, 26.1, 76, 78
 See application file for complete search history.

(56) References Cited

U.S. PATENT DOCUMENTS

| 5,668,875 | A | | 9/1997 | Brown et al. .................. 380/23 |
| 5,721,781 | A | * | 2/1998 | Deo et al. ....................... 705/67 |
| 6,223,291 | B1 | | 4/2001 | Puhl et al. ...................... 726/28 |
| 6,263,434 | B1 | * | 7/2001 | Hanna et al. .................. 713/155 |
| 6,338,138 | B1 | * | 1/2002 | Raduchel et al. ............. 713/155 |
| 6,567,915 | B1 | * | 5/2003 | Guthery ........................ 713/168 |
| 6,874,090 | B2 | * | 3/2005 | See et al. ....................... 713/150 |
| 6,880,079 | B2 | * | 4/2005 | Kefford et al. ................ 713/155 |
| 2001/0049636 | A1 | * | 12/2001 | Hudda et al. .................... 705/26 |
| 2002/0028683 | A1 | * | 3/2002 | Banatre et al. ................ 455/456 |
| 2002/0049906 | A1 | * | 4/2002 | Maruyama et al. ........... 713/176 |
| 2002/0173295 | A1 | * | 11/2002 | Nykanen et al. .............. 455/414 |
| 2002/0174335 | A1 | * | 11/2002 | Zhang et al. .................. 713/168 |
| 2003/0176218 | A1 | * | 9/2003 | LeMay et al. ................... 463/25 |

FOREIGN PATENT DOCUMENTS

| EP | 0998091 A2 | 5/2000 |
| EP | 1146692 A2 | 10/2001 |
| EP | 1146692 A3 | 10/2001 |
| EP | 0998091 A3 | 6/2002 |
| WO | WO-01/67684 A2 | 9/2001 |

OTHER PUBLICATIONS

European Office Action dated Jul. 17, 2008.
Context-Aware Computing Application, Published in Proceedings, Workshop on Mobile Computing Systems and Applications, in Jan. 1, 1995 from Schilit B; Adams N; Want R. pp. 85-90.

\* cited by examiner

*Primary Examiner* — Gilberto Barron, Jr.
*Assistant Examiner* — Izunna Okeke
(74) *Attorney, Agent, or Firm* — Harrington & Smith

(57) ABSTRACT

The invention relates to a method and device for authenticating a user of an electronic device in usage contexts being able to use in said electronic device by using a usage context identifier, wherein in the method, a usage context being used in the device is selected by the user. The method comprising maintaining a centralized register of the usage contexts available for the user in the device and the user profiles associated to said usage contexts, the device identifying an usage context selected by the user, selecting at least one user profile in response to the identified service, and authenticating the user in the selected usage context on the basis of the selected user profile.

19 Claims, 4 Drawing Sheets

METHOD AND DEVICE FOR AUTHENTICATING A USER IN A VARIETY OF CONTEXTS

The present invention relates to a method and device for authenticating a user of a wireless terminal in a variety of contexts, used in the terminal.

BACKGROUND OF TECHNOLOGY

Nowadays certificates and end user keys such as public key and secret key are used when authenticating users accessing communications networks such as the Internet, a corporate intranet, or to particular services supported therein. Certificates such as End Entity Certificates are issued by certificate authorities (CA) as a facility for certificate owners (i.e. end users) to authenticate themselves to services. Users use their private key to digitally sign m-commerce transactions. Online services can have certificates to authenticate the legitimacy of those services to browsing users.

In the near future the quantity of various mobile services and applications that require security services such as authentication and verification is going to proliferate. There will be differing certificates and user access accounts for varying services and therefore the amount of certificates the user must store in their mobile device is likely to increase. However, the usability of the electronic device is no longer intuitive and satisfying if the user has to manually select a certificate relating to a particular service from a number of certificate options.

SUMMARY OF THE INVENTION

A method and device have now been invented for authenticating the user of an electronic device in a variety of contexts and in a centralized manner. A context comprises all those events in m-commerce services and applications the user is able to use in the electronic device. The basic idea of the present invention is to identify the context the user has selected for use and to select the user profile corresponding to said context. The user profiles comprising user keys for authentication and digital signing, and user certificates for access to said contexts or to authenticate itself in said contexts, are stored in a centralized register in the electronic device. They are linked to each other so that there is a link between a particular context and a corresponding user profile. When the user selects the particular context, the device of the present invention is able to automatically identify said context of use and select a corresponding user profile for accessing the user to said context or authenticating the user in said context by using said user profile.

According to the first aspect of the invention, a method is implemented for authenticating a user of an electronic device in a plurality of usage contexts the user is able to use, characterized in that the method comprises: maintaining a centralized register of the usage contexts available for the device and predefined user profiles associated with each of the usage contexts, the device entering a particular one of said plurality of usage contexts, the device identifying said entering, selecting from the centralized register a user profile in response to said identifying, and performing authentication in the selected usage context by using data from the selected user profile.

According to a second aspect of the invention, an electronic device is implemented for authenticating a user of said electronic device in a plurality of usage contexts the user is able to use, characterized in that the device comprises: a centralized register of the usage contexts available for the device and prestored user profiles associated with each of the usage contexts, entering means for entering to a particular one of said plurality of usage contexts, identifying means for identifying said entering, selecting means for selecting from the centralized register a user profile in response to said identifying, and performing means for performing authentication in the selected usage context by using data from the selected user profile.

According to a third aspect of the invention, a computer program product is implemented for authenticating a user of said electronic device in a plurality of usage contexts the user is able to use, characterized in that the computer program product comprises: computer program code for causing the device to maintain a centralized register of the usage contexts available for the device and prestored user profiles associated with each of the usage contexts, computer program code for causing the device entering to a particular one of said plurality of usage contexts, computer program code for causing the device to identifying said entering, computer program code for causing the device to select from the centralized register a user profile in response to said identifying, and computer program code for causing the device to perform authentication in the selected usage context by using data from the selected user profile.

BRIEF DESCRIPTION OF THE DRAWINGS

In the following, the invention will be explained in detail by referring to the enclosed drawings, in which.

DETAILED DESCRIPTION

Figure 1:
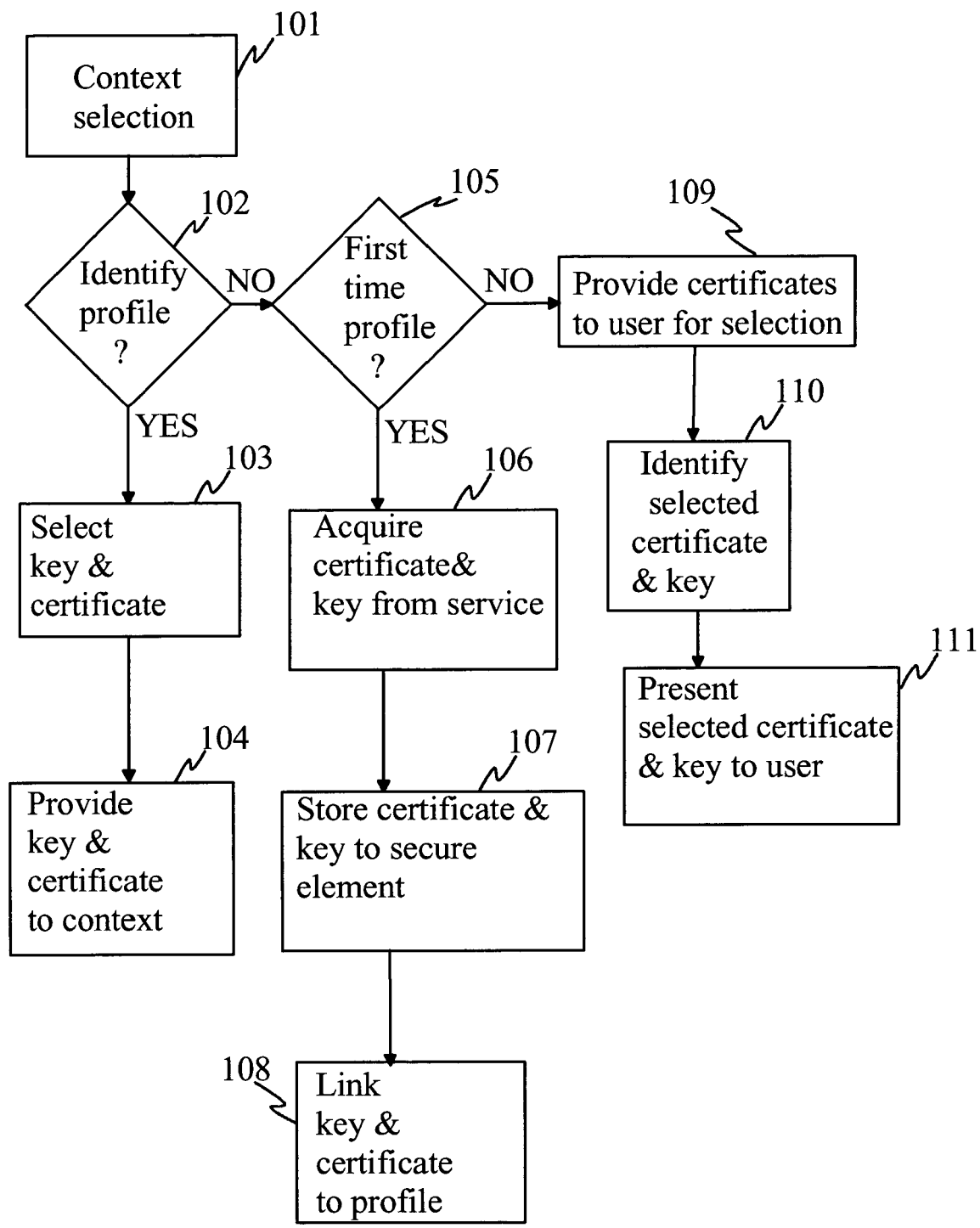
FIG. 1 illustrates a flow chart of a method according to an embodiment of the present invention.

FIG. 1 illustrates a flow chart of a method according to an embodiment of the invention. The steps of the below-described method are preferably implemented as a computer program code. In step 101 the user selects a usage context, e.g. a service or an application. An authenticating computer program application according to the invention, is started in the device such as a wireless communication device, e.g. in a cellular phone or a multimedia apparatus. The application awaits user selection for used usage context. There may be e.g. a menu structure on the display of the device where the selection is provided. User can make the selection e.g. by touching the touch sensitive display of the device or by using a keyboard by pressing appropriate button relating to the usage context on the screen or by using the keyboard for moving a cursor on the screen of the device. The usage context is an application, like a banking application or web browser for example. The user starts the application i.e. selects the usage context. The authenticating application identifies the usage context the user has selected. This can be implemented for example in a way, wherein there is a register stored into the memory of the device to where the authentication application has access. In that register there are all identifiers of all those usage contexts available for the user of the device. The authentication application detects when particular usage context is in use for example by detecting when such a usage context is launched in the device.

There is a security element in the device wherein a register comprising user keys and user certificates are located. Further into the memory of the device there is securely stored a centralized register of identifiers of the usage contexts such as services and/or applications available to the user of the device. The identifiers of the contexts register are linked to those user keys and user certificates in the security element register.

If the authenticating application identifies (step 102) the usage context the user has selected, it automatically selects the appropriate user profile, e.g. user key and user certificate to be used in said usage context. The user is notified of the selected user profile. The user profile is linked to said usage context in use e.g. in the memory or in the appropriate security element (which requires authentication access) of the device (step 103) and provides the user profile such as user key and the user certificate to the usage context (step 104). If the application is not able to identify the usage context in step 102, it checks in step 105 whether said usage context is used for the first time.

If the usage context is being used for the first time (step 105), the application prompts the user for the user profile (the user key and the user certificate) to be used with the usage context (step 106) by acquiring the key and the certificate e.g. from service or a certificate authority. A Certificate Authority is a body or organisation that has the right to create and issue certificates. Certificates are hierarchical, like a ladder. At the top of the ladder is a Root CA, which creates, issues and signs its own certificates to itself. Below that are various levels of Subordinate CAs (Sub CAs) which must apply for certificates to the Root CA, and those are signed by the Root CA. That is how certificates can be verified up the ladder to the top.

A certificate request will be done from a mobile terminal for example like disclosed in the following manner. The service asks the user to authenticate. Without a certificate, the user has three choices: 1. Can't authenticate and quits, 2. Tries anonymous login, 3. The service presents a certificate request page e.g. based on XML or other mobile browser form language. So the user accepts to request a certificate, fills in his/her details (first name, last name, mobile phone number, etc). The service processes the request, creates a service certificate, signs it with the service private key, and sends it over the air to the user. The certificate arrives to the user's device, and because it is signed, it can be verified as authentic, and the user saves it to the Security Element. Then the user can link that certificate to the profile.

The application in the device stores said user profile to the memory or e.g. to a security element (step 107) and finally links said certificate and the key to said profile (step 108).

If the usage context is not identified as a first time usage context in step 105, the application provides a selection of user profiles from the security element to the user (step 109). The usage contexts may be classified to different categories, e.g. shop, bank, home, etc. Also the certificates relating to the usage context may be classified as well. When the user selects one user profile from the list provided by the application, said user profile is identified (step 110) and appropriate user key and user certificate is selected relating to said identified user profile and said key and certificate is provided to the user (step 111) by the application. Now said key and certificate are available for the user to use in said usage context, e.g. for authenticating the user to access to the usage context such as a service or authenticating an event, like a transaction event in the usage context, like a shopping service. It is to be noted that certificates are automatically associated with key pairs (private key/public key). The private key of a service certificate never leaves the service. Only the public key and associated certificate is in the user's device. Because the keys themselves are cryptic, the user needs not to view or select the keys. Only the associated user-readable certificate information is viewable by the user.

Figure 2:
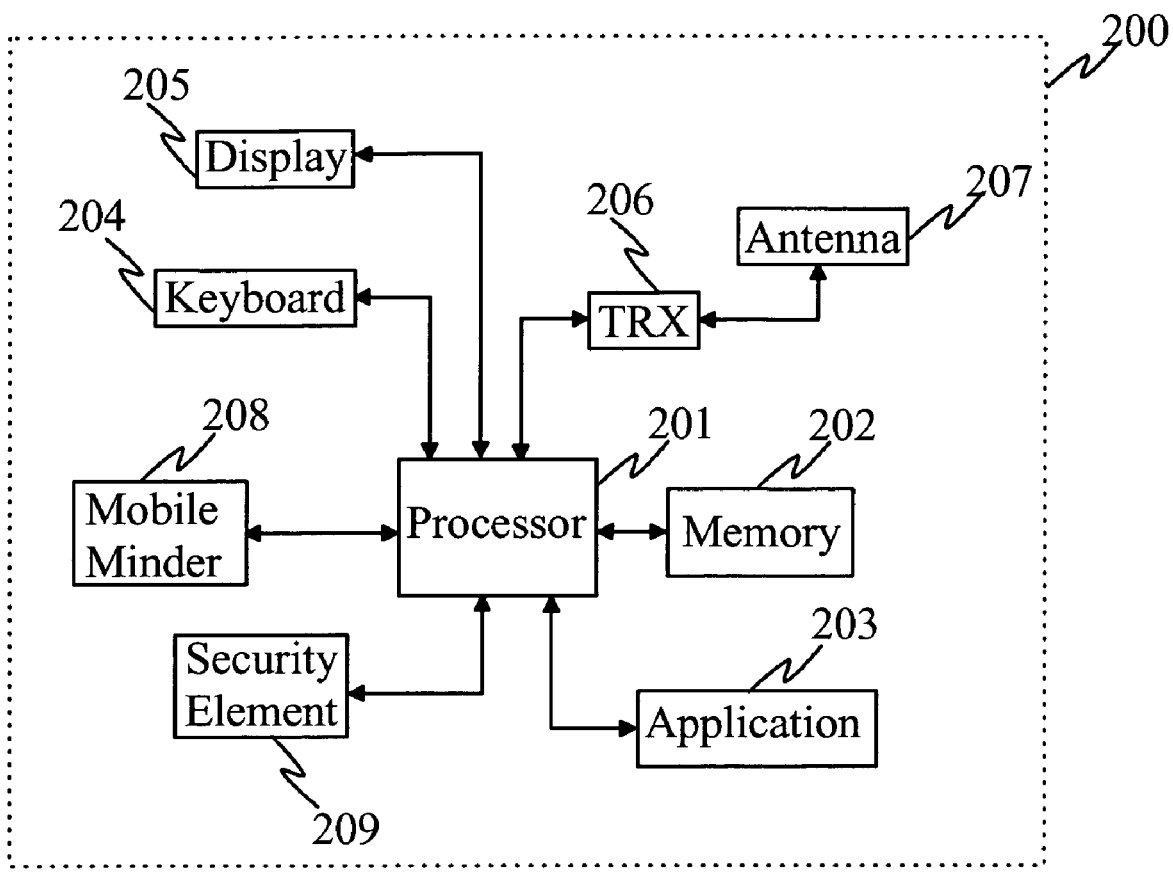
FIG. 2 illustrates an electronic device according to an embodiment of the present invention.

FIG. 2 illustrates an electronic device according to an embodiment of the present invention. The device 200 comprises a processor 201 and a memory 202 that can be e.g. read-only-memory (ROM) or random access memory (RAM) for processing the tasks of the device. The device 200 may further comprise one or several applications 203, for performing various tasks in the device 200. The device 200 further comprises a keyboard 204 and display 205 for inputting and outputting information. The device also comprises preferably a software application 208 and a security element register 209.

The application 208 can be e.g. safely placed in memory (ROM) before the user acquires the device, or it can be an add-on SW application which the user purchases from a vendor like Club Nokia and which is subsequently installed to a memory that is releasable from the device, such as the WIM (WAP Identity Module) (removable entity) or to a secure ASIC (Application Specific Integrated Circuit (fixed entity). The application 208 comprises a centralized register of the services available to the user of the device and the user profiles associated with said services. It enables user customization of security functions to create shortcuts whereby the user does not have to worry about selecting a key for home, another key for office, and so on. The application further comprises a computer program code for identifying a usage context selected by the user, a computer program code for selecting at least one user profile in response to the identified service, and a computer program code for authenticating the user in the selected service in response to the selected user profile.

In the security element 209 the resources are those user keys and user certificates. The user does not have to choose the appropriate key or certificate to use with the selected context. The application 208 is intelligent enough to recognize the context of use being started by the user, and selects the appropriate key or certificate, thereby making life of the user of the device 200 much easier and more efficient. Also, the application 208 could optionally be disabled by a technical or expert user who prefers to get close to the key and certificate handling events.

Figure 3:
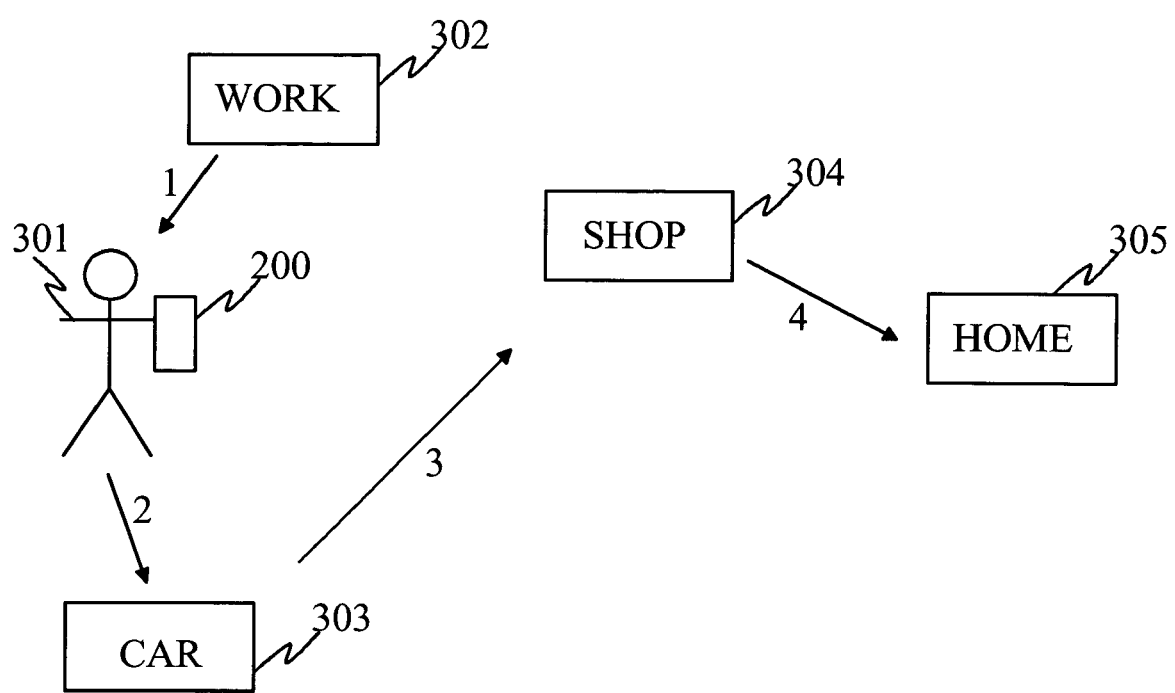
FIG. 3 illustrates a system according to an embodiment of the present invention.

FIG. 3 illustrates a system according to an embodiment of the present invention. In the system the user 301 operates a mobile communications device 200 according to the present invention. When the user is at work 301 he/she uses a work context in his/her device. A Work context is e.g. for an employee's corporate access security. When the user leaves from work 302 and goes to his/her car 303 he changes the context in use to a Drive context, which is for car access and car security setting/disabling. The user next goes to e.g. the grocery shop 304 to buy some food and changes again the context in use to a Shop context which is for user authentication of personal retail transactions. Finally the user comes home and changes the context in his device to the Home context that is the context for access to residence access and alarm controlling. In the device 200 there is the application, which is a personalised, user-configurable security add-on SW intelligent agent that can be used in a variety of contexts e.g. Work, Shop, Home, Drive, Entertainment. The device further comprises a security element that securely contains the user's keys and personal certificates. The application uses the security element resources in ways that are dependent on the requirements of the context in use. The user does not have to worry about how the device will appropriately authenticate them e.g. for corporate, home, car or shop. The application will select the appropriate level of security, the appropriate certificate information, and so on. Similarly there can be the concept of an application for teenagers devices that require additional security services, e.g. there can be contexts like School, Home, PopShop, Pals, Private chat groups, and so on.

It is possible to have several services or applications relating to a certain profile. The user profile manager can advantageously be able to detect key labels in the applications and services, like "transaction" or "receipt" for Shop profile, or "work access" or "home key" for Work and Home. Since labels will be used for m-commerce transaction handling, use of label referencing can be used in this context also.

Figure 4:
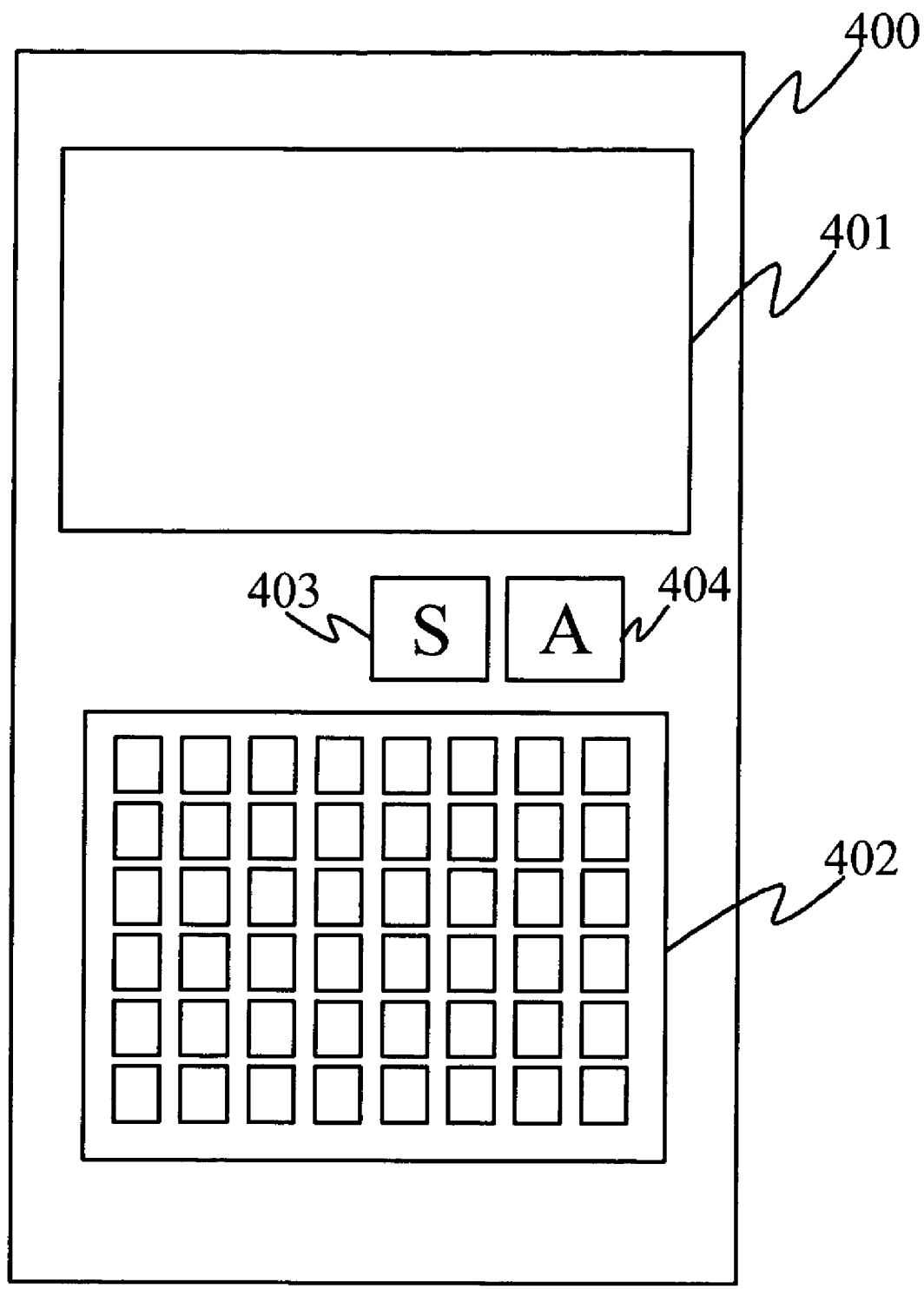
FIG. 4 illustrates a mobile communications device according to an embodiment of the present invention.

FIG. 4 illustrates a mobile communications device 400 according to the present invention. The device comprises a display 401 for providing visual information to the user and a keyboard 402 for inputting the information by the user. The device 400 further comprises signature button 403 and authentication button 404 on the phone keypad for providing easy way for users of every proficiency to launch user authentication and digital signature processes. One-touch buttons on the phone keypad can replace a complex authentication and digital signing user interfaces. The buttons are preferably intuitively labelled and can replace complex interaction sequences to perform same functions. The digital signature button 403 and user authentication button are secure short cuts to launching user authentication and digital signature processes in the mobile communications device. The user can configure the settings for those processes according to e.g. the User Guide, but can then perform the processes thereafter by simply pressing the appropriate button on the phone keypad.

In the following a practical example is illustrated regarding to the system of the present invention referring to the FIGS. 3 and 4. The user 301 sets in the device, e.g. in a communication device such as mobile phone 200 User Profile Manager in application to profile Auto Detect and the phone 200 is now in "General Profile". The user walks into shop 304, e.g. into record store, and the phone 200 detects that the user is in said store from a local cell registration of the store 304. The phone 200 briefly prompts the user and beeps message "Activate Shop Profile?" (the user must be in control and have a choice) on the display 401. If the user selects Yes, the phone goes into Shop Profile mode, which allows the phone 200 to receive messages over the air from the local cell broadcast about special offers. The user 301 is attracted to one special offer and goes to collect it. Finally the user 301 checks out and he/she decides to pay by an electronic credit card (e-card). The user 301 presses the "A" button 404 on the keypad and enters the relevant PIN to authenticate e-card (like showing driver's license to authenticate ownership of credit card). The checkout accepts authentication of e-card and forwards e-invoice to the user's phone 200. The phone 200 receives the e-invoice, receipts the e-invoice to the use which the user 301 signs thereby authenticating the transaction. The user 301 then selects the "S" button 403 on the keypad and enters the relevant PIN to access the signing key which signs the e-invoice and the phone 200 automatically selects User's certificate key to sign the e-invoice. The phone 200 briefly displays and beeps message "Transaction signed and completed" and after that the user 301 leaves the store 304. Then the phone 200 detects that the user has left the local cell of the store 304. The phone 200 briefly displays and beeps message "Shop Profile de-activated" and after that it displays and beeps message "General Profile activated".

In digital signing, the user has a private key in the security element, which never leaves the security element. To sign a context, the user first presses the "A" button to authenticate himself/herself to the device or to the security element using a PIN (if it is closed). If the security element is already open the user can press the "S" button which then authenticates by using a PIN code to access the signing key in the security element. For security reasons it is preferable always to request a pin code in order to sign a context.

This paper presents the implementation and embodiments of the invention with the help of examples. A person skilled in the art will appreciate that the present invention is not restricted to details of the embodiments presented above and that the invention can also be implemented in another form without deviating from the characteristics of the invention. The presented embodiments should be regarded as illustrative but not restricting. Thus, the possibilities of implementing and using the invention are only restricted by the enclosed claims, and the various options of implementing the invention as determined by the claims, including the equivalent implementations, also belong to the scope of the invention.

What is claimed is:

1. A method comprising:
   maintaining, at a mobile electronic device, a centralized register of at least one usage context;
   prompting a user of the mobile electronic device to select, with a user input of the mobile electronic device, a particular one of said at least one usage context;
   identifying the selected usage context using identifiers stored in the centralized register, each of the identifiers associated with a usage context of the at least one usage context, each of the identifiers linked to a user key and user certificate for the user and stored in a security element of the mobile electronic device,
      for the case the selected usage context is not identified, then determining whether the selected usage context is used for the first time,
         in response to the determining the selected usage context is used for the first time, prompting the user to perform a certificate request via a wireless communication with one of a service and certificate authority, where the user authenticates with the one of a service and certificate authority using the user input, and obtains, via the wireless communication, the user key and user certificate to link with the selected usage context, and
         in response to the determining the selected usage context is not used for the first time, prompting the user to select with the user input, from the security element of the mobile electronic device, a particular user key and user certificate from a selection indicated on the display of the mobile electronic device and linking the selected particular user key and user certificate with the selected usage context; and
   automatically selecting the user key and certificate linked to said selected usage context, wherein the selected usage context is for use in a transaction made by the user.

2. The method according to claim 1, further comprising performing authentication of the user of the mobile electronic device in the selected usage context for use in the transaction made by the user, wherein performing the authentication comprises prompting the user to enter, with the user input of the mobile electronic device, a personal identification number, wherein the user of the mobile electronic device entering the personal identification number with the user input of the mobile electronic device authenticates electronic credit card information stored on the mobile electronic device to be used by the mobile electronic device to pay for the transaction made by the user.

3. The method according to claim 1, wherein said user key further comprises at least one of the following a public key and a secret key.

4. The method according to claim 1, wherein the selected usage context comprises an event in a service or application being used in the mobile electronic device by the user, said event further comprising at least one of the following: authentication event, verifying event.

5. The method according to claim 1, wherein the mobile electronic device is a cellular device, wherein the prompting the user to select the particular usage context is in response to the cellular device automatically detecting a local cell registration for a location of the cellular device, and wherein in response to entering the selected usage context the cellular device receives local cell broadcast messages about special offers for the location.

6. The method according to claim 2, further comprising:
displaying, on the display of the mobile electronic device, an indication of a transaction invoice for the transaction made by the user; and
prompting the user to electronically sign the transaction invoice at the mobile communication device using the user input of the mobile electronic device.

7. The method according to claim 1, wherein the particular one of said at least one usage context is indicated on the display of the mobile electronic device based on a location of the mobile electronic device and wherein the selected usage context is de-selected when the mobile electronic device leaves the location.

8. An apparatus comprising:
at least one processor; and
at least one memory including computer program code, wherein the at least one memory and the computer program code are configured, with the at least one processor, to cause the apparatus to at least:
maintain, at a mobile electronic device, a centralized register comprising at least one usage context;
prompt a user of the mobile electronic device to select, with a user input of the mobile electronic device, a particular one of said at least one usage context;
identify the selected usage context using identifiers stored in the centralized register, each of the identifiers associated with a usage context of the at least one usage context, each of the identifiers linked to a user key and user certificate for the user and stored in a security element of the mobile electronic device,
for the case the selected usage context is not identified, then determining whether the selected usage context is used for the first time,
in response to the determining the selected usage context is used for the first time, prompt the user to perform a certificate request via a wireless communication with one of a service and certificate authority, where the user authenticates with the one of a service and certificate authority using the user input, and obtains, via the wireless communication, the user key and user certificate to link with the selected usage context, and
in response to the determining the selected usage context is not used for the first time, prompt the user to select with the user input, from the security element of the mobile electronic device, a particular user key and user certificate from a selection indicated on the display of the mobile electronic device and link the selected particular user key and user certificate with the selected usage context; and
automatically selecting the user key and certificate linked to said selected usage context, wherein the selected usage context is for use in a transaction made by the user.

9. The apparatus according to claim 8, wherein the particular one of said at least one usage context is indicated on the display of the mobile electronic device based on a location of the mobile electronic device and wherein the selected usage context is de-selected when the mobile electronic device leaves the location.

10. A non-transitory memory encoded with a computer program executable by a processor to perform actions of an electronic device for authenticating a user of said electronic device in a plurality of usage contexts the user is able to use, the actions comprising:
maintaining, at a mobile electronic device, a centralized register of at least one usage context;
prompting a user of the mobile electronic device to select, with a user input of the mobile electronic device, a particular one of said at least one usage context;
identifying the selected usage context using identifiers stored in the centralized register, each of the identifiers associated with a usage context of the at least one usage context, each of the identifiers linked to a user key and user certificate for the user and stored in a security element of the mobile electronic device,
for the case the selected usage context is not identified, then determining whether the selected usage context is used for the first time,
in response to the determining the selected usage context is used for the first time, prompting the user to request a user key and certificate via a wirelessly communication with one of a service and certificate authority in order to perform a certificate request, where the user authenticates with the one of a service and certificate authority using the user input, and obtains, via the wireless communication, the user key and user certificate to associate with the selected usage context, and
in response to the determining the selected usage context is not used for the first time, prompting the user to select with the user input, from the security element of the mobile electronic device, a particular user key and user certificate from a selection indicated on the display of the mobile electronic device and linking the selected particular user key and user certificate with the selected usage context; and
automatically selecting the user key and certificate linked to said selected usage context, wherein the selected usage context is for use in a transaction made by the user.

11. The apparatus according to claim 8, wherein the mobile electronic device is a cellular device, wherein the prompting the user to select the particular usage context is in response to the cellular device automatically detecting a local cell registration for a location of the cellular device, and wherein in response to entering the selected usage context the cellular device receives local cell broadcast messages about special offers for the location.

12. The apparatus according to claim 8, further comprising the at least one memory including the computer program code is configured, with the at least one processor, to cause the apparatus to:
display, on the display of the mobile electronic device, an indication of a transaction invoice for the transaction made by the user; and
prompt the user to electronically sign the transaction invoice at the mobile communication device using the user input of the mobile electronic device.

13. The apparatus according to claim 8, wherein the at least one memory and the computer program code are configured, with the at least one processor, to cause the apparatus to at least perform authentication of the user of the mobile electronic device in the selected usage context for use in the transaction made by the user, wherein performing the authentication comprises prompting the user to enter, with the user input of the mobile electronic device, a personal identification number, wherein the user of the mobile electronic device entering the personal identification number with the user input of the mobile electronic device authenticates electronic credit card information stored on the mobile electronic device to be used by the mobile electronic device to pay for the transaction made by the user.

14. The apparatus according to claim 13, wherein the at least one memory and the computer program code are configured, with the at least one processor, to cause the apparatus to at least:
 display, on the display of the mobile electronic device, an indication of a transaction invoice for the transaction made by the user; and
 prompt the user to electronically sign the transaction invoice at the mobile communication device using the user input of the mobile electronic device.

15. The non-transitory memory according to claim 10, further comprising performing authentication of the user of the mobile electronic device in the selected usage context for use in the transaction made by the user, wherein performing the authentication comprises prompting the user to enter, with the user input of the mobile electronic device, a personal identification number, wherein the user of the mobile electronic device entering the personal identification number with the user input of the mobile electronic device authenticates electronic credit card information stored on the mobile electronic device to be used by the mobile electronic device to pay for the transaction made by the user.

16. The non-transitory memory according to claim 10, wherein the particular one of said at least one usage context is indicated on the display of the mobile electronic device based on a location of the mobile electronic device and wherein the selected usage context is de-selected when the mobile electronic device leaves the location.

17. The method according to claim 1, wherein the user is notified of the selected particular user key and user certificate by displaying the selected particular user key and user certificate on the display of the mobile electronic device.

18. The apparatus according to claim 8, wherein the at least one memory including the computer program code is configured, with the at least one processor, to cause the apparatus to notify the user of the selected particular user key and user certificate by displaying the selected particular user key and user certificate on the display of the mobile electronic device.

19. The non-transitory memory according to claim 10, wherein the user is notified of the selected particular user key and user certificate by displaying the selected particular user key and user certificate on the display of the mobile electronic device.

\* \* \* \* \*